(12) United States Patent
Hehl

(10) Patent No.: US 7,261,555 B1
(45) Date of Patent: Aug. 28, 2007

(54) CLOSING DEVICE IN A PLASTIC INJECTION MOLDING MACHINE

(76) Inventor: Karl Hehl, Arthur-Hehl-Strasse, D-72290 Lossburg (DE)

( * ) Notice: Subject to any disclaimer, the term of this patent is extended or adjusted under 35 U.S.C. 154(b) by 295 days.

(21) Appl. No.: 10/506,204

(22) PCT Filed: Feb. 25, 2003

(86) PCT No.: PCT/EP03/01875

§ 371 (c)(1),
(2), (4) Date: Aug. 31, 2004

(87) PCT Pub. No.: WO03/074253

PCT Pub. Date: Sep. 12, 2003

(30) Foreign Application Priority Data

Mar. 7, 2002 (DE) .................. 102 09 921

(51) Int. Cl.
*B29C 45/67* (2006.01)
(52) U.S. Cl. ............... 425/589; 425/590; 425/595
(58) Field of Classification Search ............... 425/589, 425/590, 595, 451.2
See application file for complete search history.

(56) References Cited

U.S. PATENT DOCUMENTS

| | | | |
|---|---|---|---|
| 3,786,725 A | 1/1974 | Aoki | |
| 4,380,427 A | 4/1983 | Hehl | |
| 4,846,664 A * | 7/1989 | Hehl | 425/590 |
| 4,861,259 A * | 8/1989 | Takada | 425/451.2 |
| 4,865,537 A * | 9/1989 | Shima | 425/590 |
| 4,981,426 A * | 1/1991 | Aoki | 425/590 |
| 5,052,910 A * | 10/1991 | Hehl | 425/589 |
| 5,129,806 A * | 7/1992 | Hehl | 425/590 |
| 5,910,328 A * | 6/1999 | Oshiro et al. | 425/595 |

FOREIGN PATENT DOCUMENTS

| | | |
|---|---|---|
| DE | 36 44 181 | 4/1988 |
| DE | 38 44 432 | 1/1990 |
| DE | 41 17 852 | 12/1994 |
| DE | 100 51 255 | 5/2002 |
| EP | 0 281 329 | 9/1988 |
| EP | 0 281 330 | 9/1988 |
| JP | 53-7762 | 1/1978 |

OTHER PUBLICATIONS

International Search Report for PCT/EP03/01875 dated Jun. 30, 2003.

* cited by examiner

*Primary Examiner*—James P. Mackey
(74) *Attorney, Agent, or Firm*—Cantor Colburn LLP

(57) ABSTRACT

A closing device in a hydraulic injection molding machine includes at least one pressure cylinder unit for building up locking pressure and a drive cylinder mounted in the pressure piston of the pressure cylinder unit for closing the injection mold. The drive cylinder is arranged concentrically relative to the central axis of the pressure cylinder unit. A support element for the pressure cylinder is jutted out by at least one cylinder of the mold closing unit on the side opposite to the stationary mold carrier, the cylinder being connected to the support element and stationary as a result thereof. The support element forms thereby a single piece with the stationary cylinder of the mold closing unit that is connected to the support element. This provides a space-saving structure that meets precision requirements for the production of injection molded parts.

13 Claims, 6 Drawing Sheets

CLOSING DEVICE IN A PLASTIC INJECTION MOLDING MACHINE

REFERENCE TO RELATED APPLICATIONS

Figure 1:
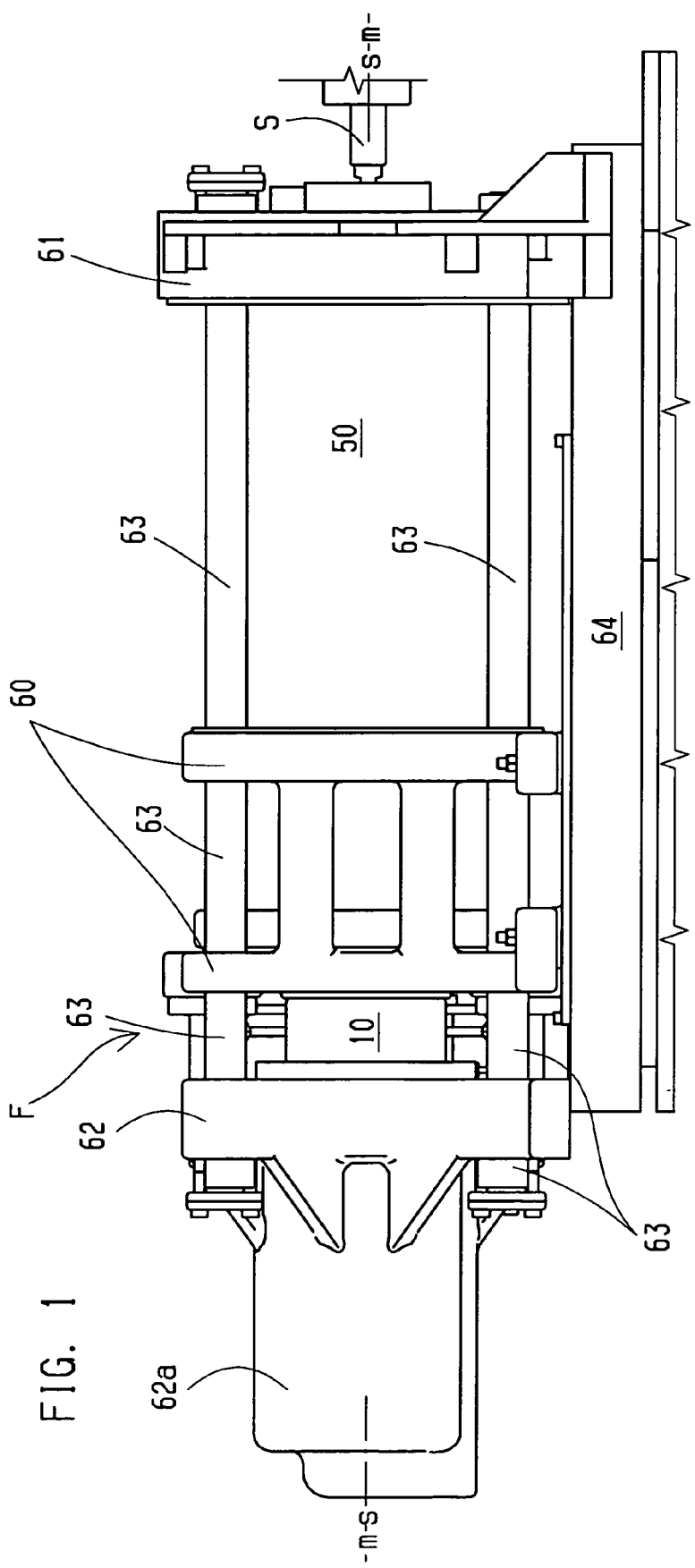

The present application claims the priority of German Patent Application 102 09 921.9, filed on Jul. 3, 2002, the disclosure content of which is hereby expressly also made the subject of the present application.

FIELD OF THE INVENTION

The invention relates to a closing device on the mould closing unit of a plastics material injection molding machine for processing plastics materials and other plasticizable substances.

STATE OF THE ART

This type of closing device is known in DE 36 44 181 C1. In a pressure cylinder, which is disposed symmetrically relative to an axis of symmetry of the mould closing device, a drive cylinder is disposed in the piston of the pressure cylinder. The pressure cylinder is clamped with a mounting plate, which is constructed as support for the closing device, and a cylinder cover to form the closing cylinder. The pressure piston of the pressure cylinder is displaceable together with the movable mould carrier. The piston rod of the drive cylinder is disposed so as to be stationary. Two compensating cylinders are disposed diametrally relative to the pressure cylinder, said compensating cylinders being in open connection with the low pressure chamber of the pressure cylinder. During the closing movement, hydraulic medium is transferred from the compensating cylinders and the low pressure chamber into the high pressure chamber in order to apply the closing force. However, the volume of the compensating cylinders is restricted in the case of such a embodiment and in order to guarantee that the force is introduced in a symmetrical manner, corresponding expenditure on precision is necessary.

For applying greater forces, DE 38 44 432 C1 makes known a closing device having at least two pressure cylinders disposed symmetrically relative to the central axis. In addition, the drive cylinder is disposed in a central manner and lies in the compensating cylinder. In practice, it has been shown in the case of sensitive injection molded parts that, in spite of the symmetrical arrangement of the pressure cylinders, under certain circumstances, above all after a corresponding service life of the machine, there can be unevenness in the build-up of the closing pressure, which effects the precision of the injection molded parts.

In the case of a closing device known in EP 0 281 329 A2, a drive cylinder is disposed in the pressure piston of a central pressure cylinder. Volume displaced by the pressure piston is transferred into a compensating cylinder, pressure piston and piston of the compensating cylinder being guided in common on the movable mould carrier. The compensating cylinder, however, is situated below the pressure cylinder and inasmuch, is disposed in an asymmetrical manner. Although the compensating cylinder is a passive cylinder, the asymmetrical arrangement results in the force being applied in an uneven manner and in the abovementioned disadvantages.

A multiple-piece closing cylinder for an injection molding machine has already been put forward in DE 41 17 852 C2 with the aim of reducing the structural volume and the volume of the pressure medium to be circulated. Via two pistons, which nest in one another, there is serial closing with a separate stroke movement to apply the closing force. There is no compensating cylinder provided. The described construction, however, does not meet the demands for precision for the production of injection moldings and long pressure build-up times are produced.

EP 0 281 330 A2 makes known nesting the drive cylinder and the pressure cylinder in one another, however does not make known providing a compensating cylinder, but rather guides displaced hydraulic medium via a tank of the machine. This results in a regular fast exchange of hydraulic medium, but increases the pressure build-up times.

The prior, subsequently published DE 100 51 255 C1 makes known nesting the cylinders of the closing device inside one another. All cylinders are disposed concentrically relative to a central axis, which means that the force is introduced concentrically relative to this central axis. A supporting element disposed at the end of the closing cylinder remote from the stationary mould carrier is connected to the closing cylinder and at the rear is connected to force transferring elements in the form of columns, which in their turn are connected to the stationary mould carrier. This leads to corresponding extensions of the columns as the closing force builds-up and consequently to an increase in pressure build-up times.

SUMMARY OF THE INVENTION

Proceeding from this state of the art, an exemplary embodiment of the invention includes a closing device for an injection molding machine, which closing device, in a space-saving construction, meets the demands for precision for the production of injection moldings.

The supporting element and the cylinder disposed thereon are produced in one piece. This results in a shorter and more rigid column system or respectively guiding system. On account of the shortening of the guide columns, a smaller extension is necessary for the same force, so that the pressure build-up and pressure removal times are reduced. The rigidity achieved through the reduction in component parts increases the precision of the guiding of the movable mould carrier, which means that a higher degree of precision is achieved also for the production of injection moldings. At the same time, the arrangement of the supporting element at the end of the cylinder near to the stationary mould carrier provides a supporting of the cylinder system relative to the machine base in the optimized center of gravity.

SHORT DESCRIPTION OF THE FIGURES

Figure 2:
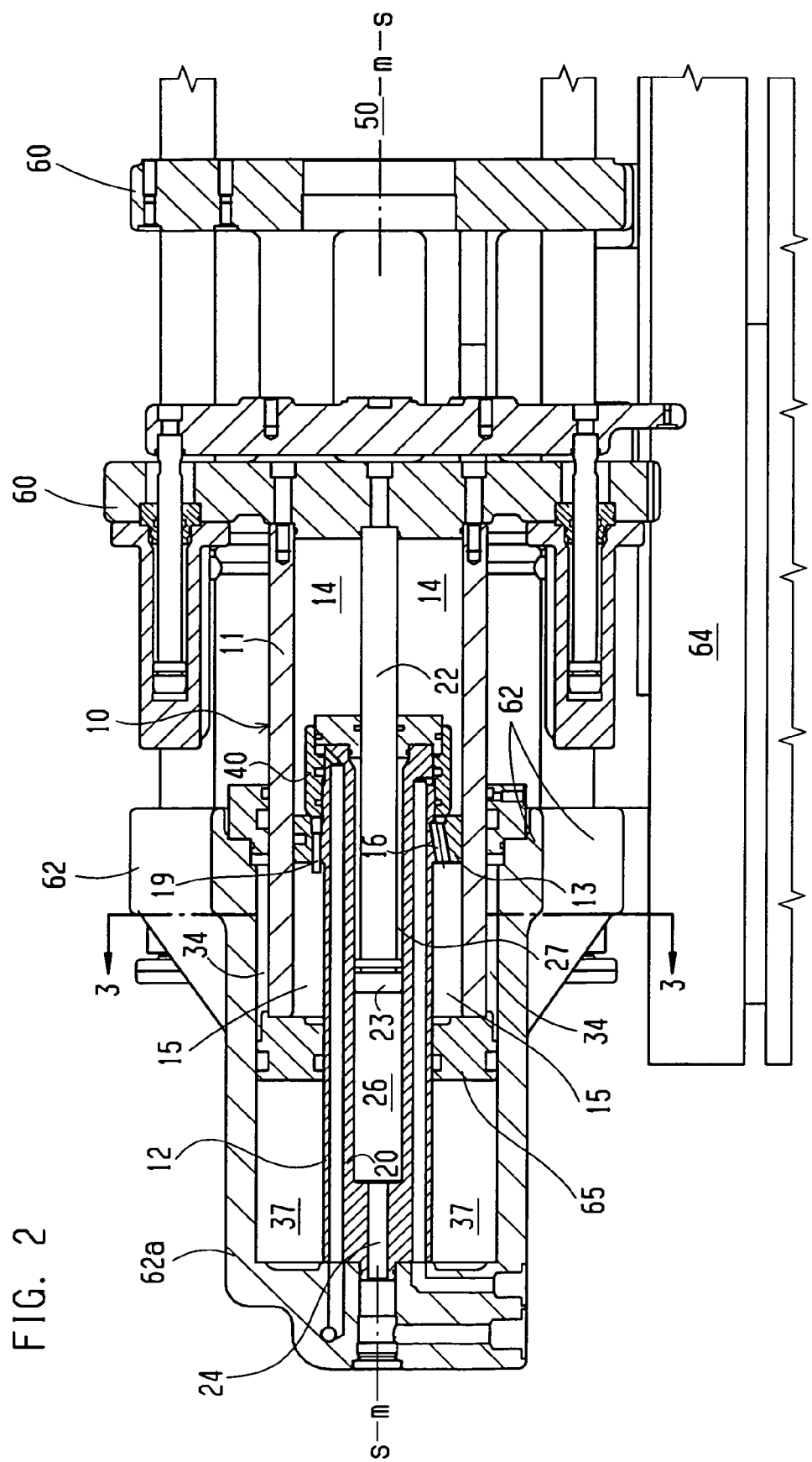
Figure 3:
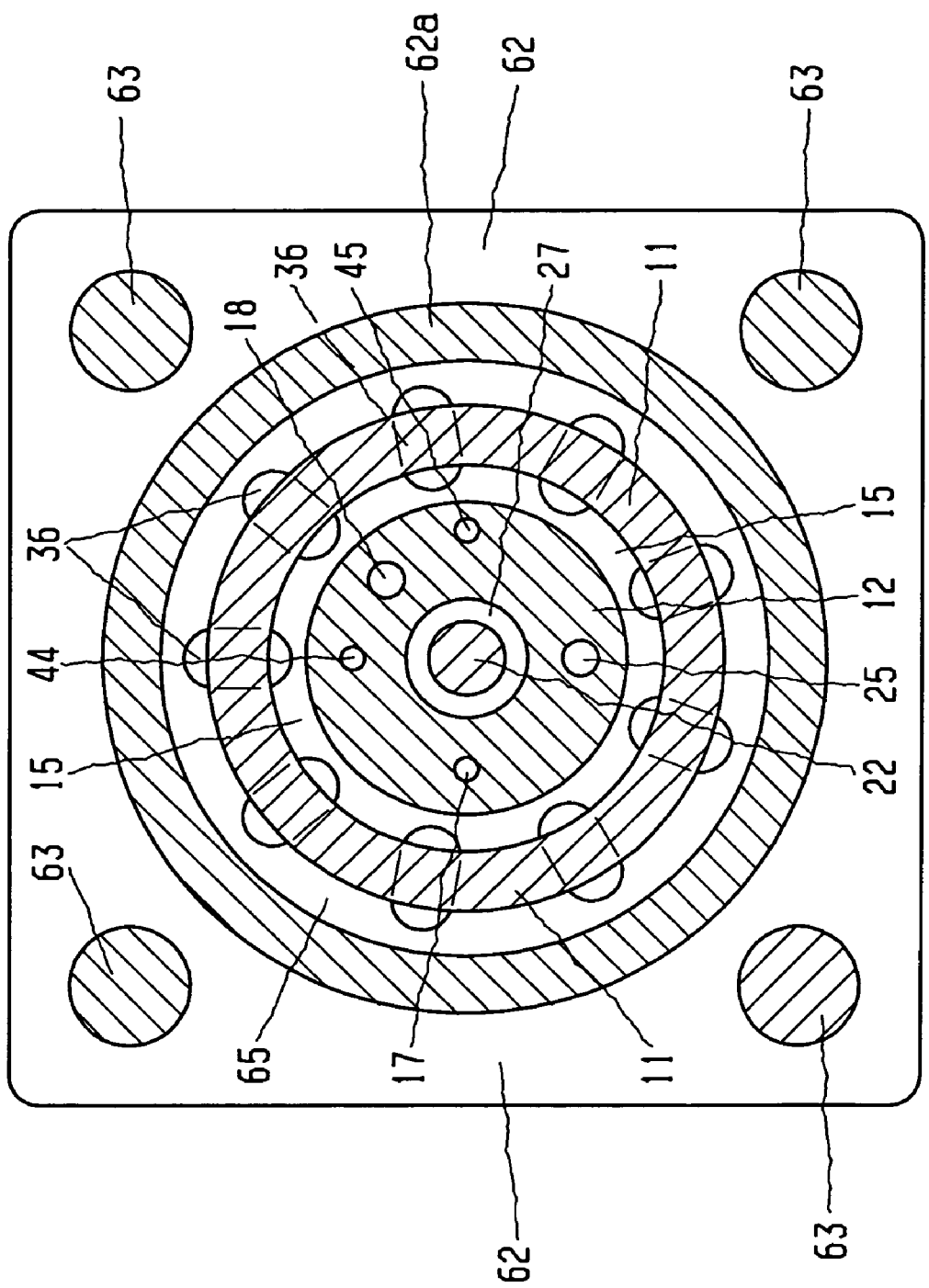
Figure 4:
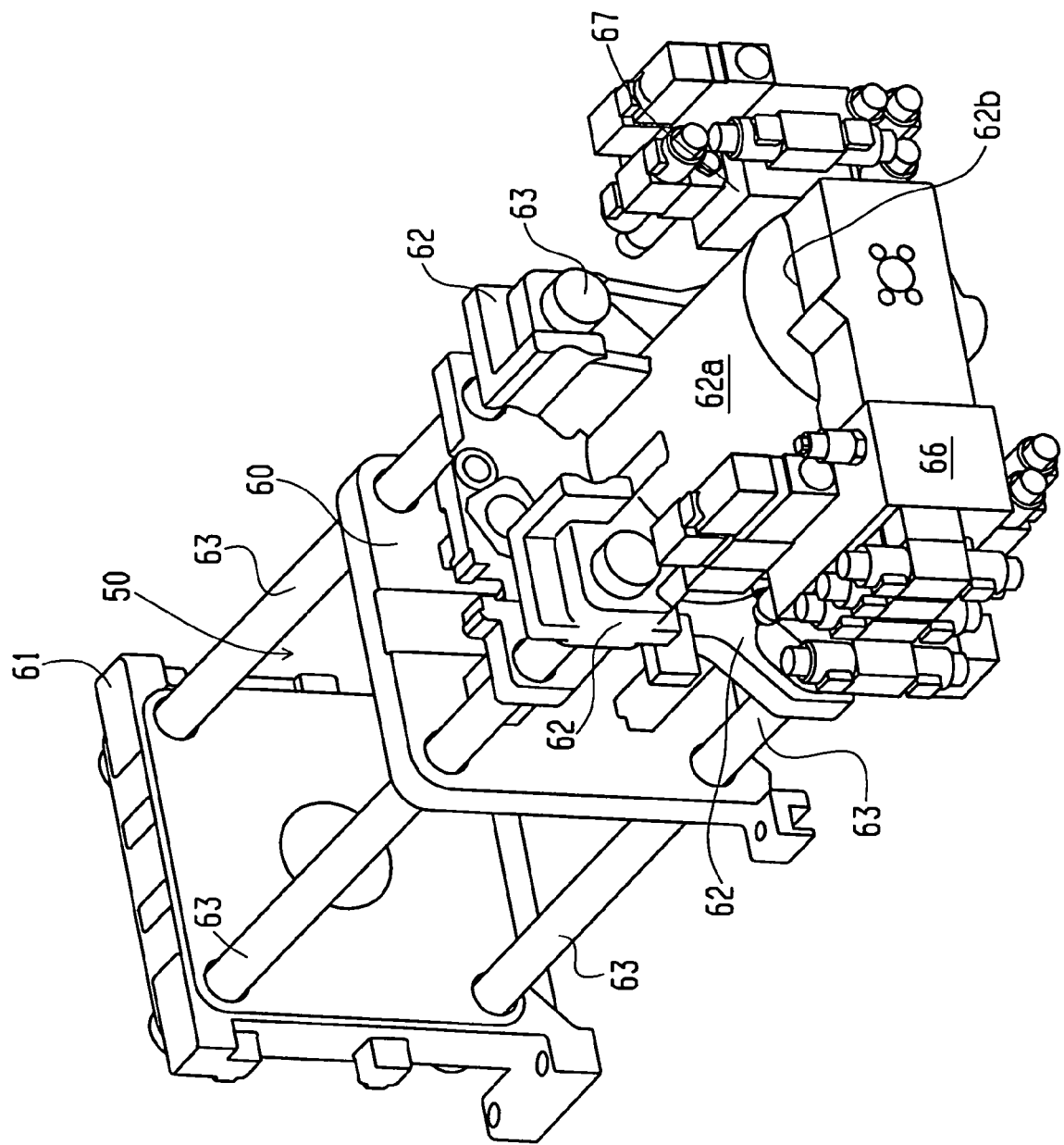
Figure 5:
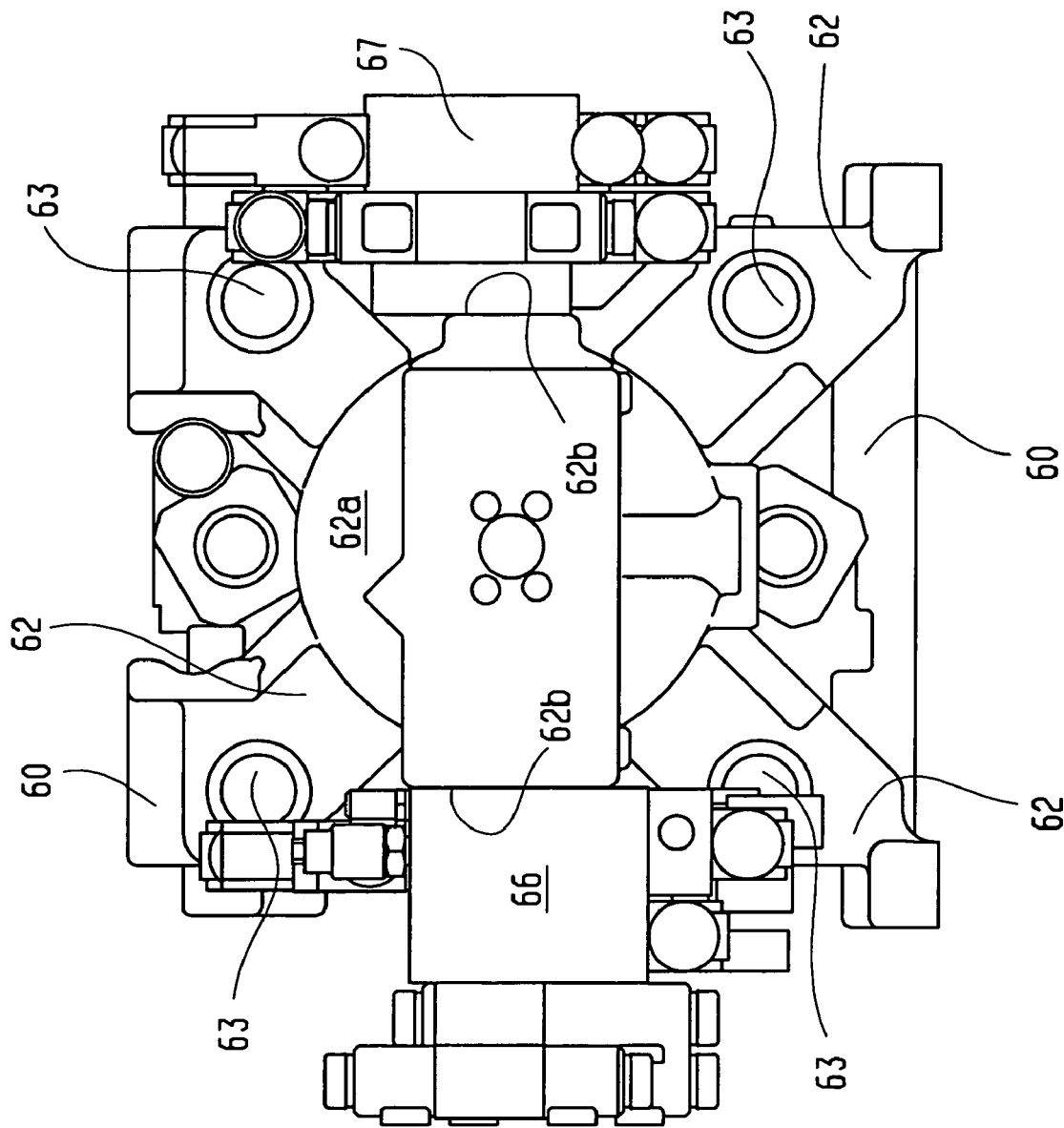
Figure 6:
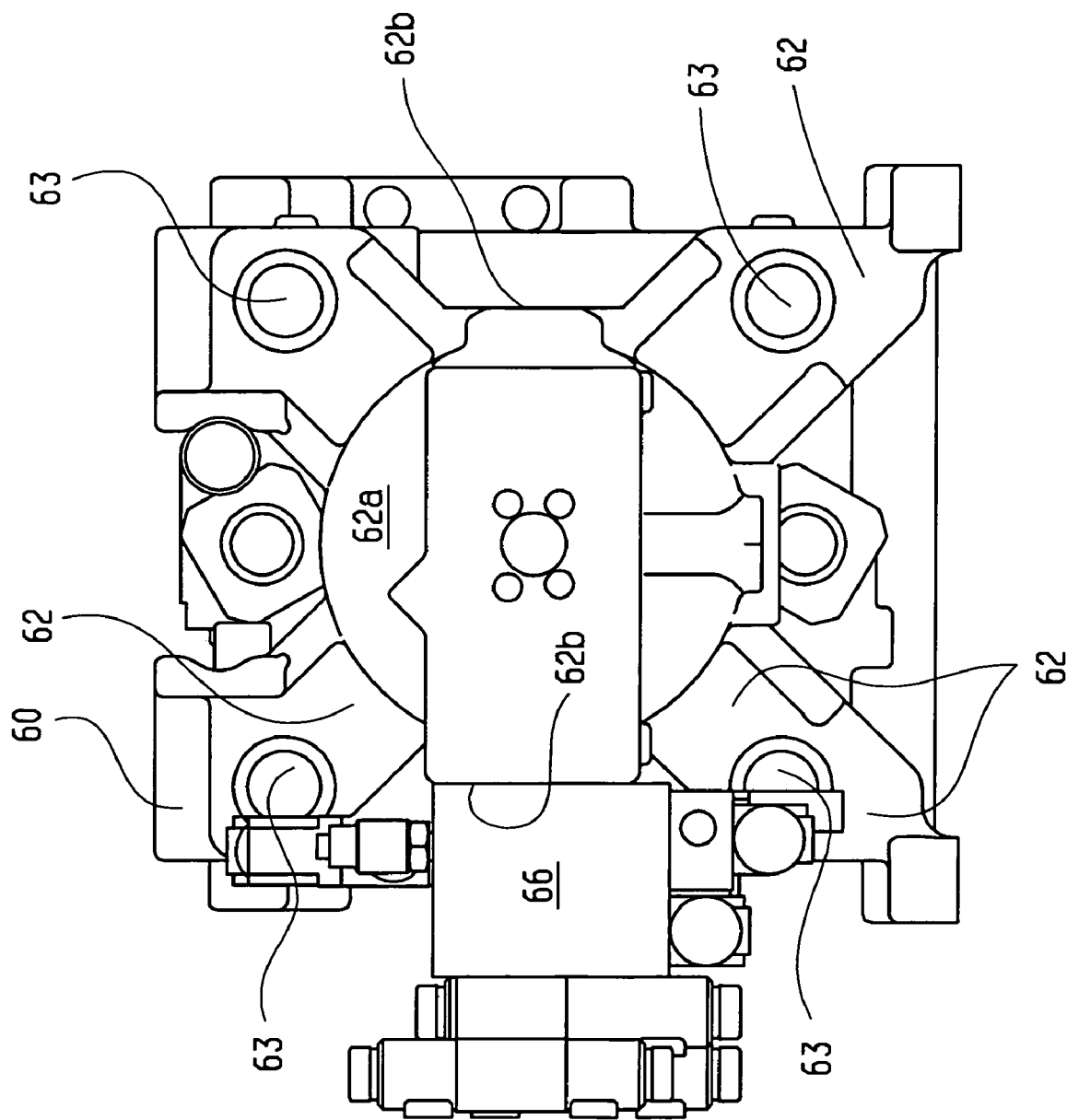

The invention is described in more detail below by way of an exemplified embodiment. In which:

FIG. 1 is a side view of a cutout of an injection molding machine with a mould closing unit disposed on a machine base with the associated injection molding unit, FIG. 2 is an enlarged longitudinal section through the closing device of FIG. 1 with the injection mould open, FIG. 3 is a section according to line 3-3 in FIG. 2, FIG. 4 is a three-dimensional representation of a closing device in another exemplified embodiment, FIG. 5 is an end view of the closing device in FIG. 4, FIG. 6 is the view in FIG. 5 with only one distribution block.

DETAILED DESCRIPTION OF PREFERRED EMBODIMENTS

The invention is described in more detail below in an exemplary man-ner with reference to the enclosed drawings. However, the embodiments are only examples and are not meant to restrict the inventive concept to a specific arrangement.

FIG. 1 shows the closing device on a mould closing unit F of a plastics material injection molding machine for processing plastics materials and other plasticizable substances such as, for example, powdery substances or ceramic substances. The mould closing unit F is supported on a machine base 64 and includes a stationary mould carrier 61, a movable mould carrier 60 as well as a supporting element 62. The closing device, of which the external compensating cylinder 62a and the pressure cylinder 11 serving this compensating cylinder as a piston can be seen in FIG. 1, is supported on the supporting element 62. When the pressure cylinder unit 10 is actuated, the movable mould carrier 60 is displaced, it being guided along the guide braces or guide columns 63. An injection mould assembly (not represented in the drawing) is accommodatable in the mould clamping area 50 and is cyclically opened and closed due to the movement of the closing device. In the closed condition, plasticised material is injected into the mould cavity of the injection mould M by the injection molding unit S via an opening of the stationary mould carrier 61. FIG. 1 basically shows the conventional construction of a mould closing unit on a plastics material injection molding machine. However, other superstructures of the mould closing unit are also possible. In this way, for example, in the case of an embodiment according to FIGS. 4 to 6, the supporting element 62 can also be mounted via a stationary bearing arrangement on the machine base 64 or on a part thereof, such that the compensating cylinder 62a is also stationary. The "stationary" mould carrier 61 is displaced inasmuch during mould closure on account of the columns elongation in closing direction, but forms nevertheless a reference point for the injection molding unit.

According to FIGS. 1 and 2, the supporting element 62 for the pressure cylinder unit 10, on the side remote from the stationary mould carrier 61, is protruded beyond by at least one cylinder of the mould closing unit F, said cylinder being connected to the supporting element 62 and thereby being stationary. The supporting element is produced in one piece with the mould closing unit, in the exemplified embodiment in the form of a casting.

It can be clearly seen that the guide columns 63 terminate at the level of the supporting element 62. This achieves a shorter and more rigid column system or respectively guiding system. On account of the shortening of the guide columns 63, a smaller overall extension is necessary to build-up the same force, which means that the pressure build-up and pressure removal times are reduced. The rigidity achieved through the reduction in component parts increases the precision of the guiding of the movable mould carrier and consequently also the precision during the production of the injection moldings. At the same time, through the arrangement of the supporting element 62 at the end of the cylinder nearer to the stationary mould carrier 61, the cylinder system is supported relative to the machine base at the optimized point of gravity.

The protruding, external cylinder is the compensating cylinder 62a, which is configured together with the supporting element preferably in the form of a one-piece casting. Consequently, the closing device is constructed in such a manner that the cylinders of the closing device nest in one another. All cylinders are disposed concentrically relative to a central axis m-m, which means that the force is introduced concentrically relative to this central axis. Consequently, the force is no longer introduced in an asymmetrical manner internally of the closing device, which means that the guaranteed level of precision of the injection molding machine is even higher. At the same time, the volume of hydraulic medium necessary to build-up the closing pressure is easily available as, when moved, it is displaced from the compensating cylinder chamber 34 and low pressure chamber 15 through the pressure piston 13 into the high pressure chamber 14. This makes rapid pressure build-up times possible.

According to FIGS. 2 and 3, the closing device has at least one hydraulic pressure cylinder unit 10 for building-up the closing pressure when the injection mould assembly is closed. Only one single pressure cylinder unit 10 is shown in the embodiment, the central axis m-m of which cylinder unit 10 is, at the same time, the central axis or respectively axis of symmetry s-s of the mould closing unit. The advantage of this is that the force is introduced in a symmetrical manner onto the movable mould carrier 60 and consequently onto the injection mould M. In principle, several correspondingly constructed closing devices can also be disposed parallel to one another, as long as a correspondingly even pressure build-up in the individual pressure cylinder units is guaranteed. This embodiment produces a space-saving construction, as the corresponding overflow channels are provided directly in the respective pistons of compensating cylinder and pressure cylinder unit, which means that there is no need for additional hydraulic lines, which would have a negative effect on pressure build-up times and efficiency.

In the pressure cylinder unit 10 there is provided a pressure piston 13, the piston rod 12 of which is disposed along the central axis m-m of the pressure cylinder unit 10. According to FIG. 2, this pressure piston 13 separates the high pressure chamber 14 of the pressure cylinder unit from the low pressure chamber 15. The closing pressure is built-up in the high pressure chamber 14 within the cylinder 11 via the pressure cylinder unit 10, above all once the mould is closed. The opening and closing of the injection mould— wherein essentially the mass of the closing device has to be displaced which means that a lower pressure suffices therefor is effected via a hydraulic drive cylinder 20 associated with the pressure cylinder unit 10. The drive cylinder 20 lies concentrically in the pressure cylinder unit 10, and concentrically relative to the central axis m-m, its actual cylinder being formed by the piston rod 12 of the pressure cylinder unit 10. If there is only one pressure cylinder unit, the force is introduced in an optimum symmetrical manner, since, however, on the other hand, the cylinders surround one another in a totally extensive manner, the necessary volumes can be made available in a space-saving manner.

For closing the mould, hydraulic medium is supplied to the cylinder chamber 26 via a hydraulic line in the form of the bore 24, for opening the mould hydraulic medium is supplied to the cylinder chamber 27 via a hydraulic line disposed in the piston rod 12 of the pressure cylinder unit in the form of the bore 25 (FIG. 3). In order not to pump the hydraulic medium, displaced through the pressure piston 13 out of the high pressure chamber 14 when the injection mould assembly M is opened, into the tank at every injection cycle and subsequently to pump it from there back into the high pressure chamber, the compensating cylinder 62a is provided for accommodating hydraulic medium coming out of the pressure cylinder unit 10 or respectively for discharging hydraulic medium to be deposited at the pressure cylinder unit 10. The compensating cylinder chamber 34 is in open connection with the low pressure chamber 15 of the pressure cylinder unit 10.

According to FIG. 3 in conjunction with FIG. 2, the compensating cylinder 62a is also disposed concentrically relative to the central axis m-m. Consequently, all cylinders are nested in one another and disposed concentrically relative to the central axis m-m. This leads to a symmetrical construction, which means that the actually only passive volume of the compensating cylinder can never have a negative influence on the precision of the injection molding machine.

This arrangement leads to the actual piston rod of the compensating cylinder 62a being formed by the cylinder 11 of the pressure cylinder unit 10, that-is-to-say, in a similar manner, it fulfils a double function like the piston rod 12 of the pressure cylinder unit 10 with reference to the drive cylinder 20. In the exemplified embodiment, the pressure piston 13 and the piston rod 12 are connected to the stationary compensating cylinder 62a, which is produced in one piece with the supporting element 62. The cylinder 11 of the pressure cylinder unit 10 and consequently the piston of the compensating cylinder as well as the piston rod 22 with the piston 23 of the drive cylinder are connected to the movable mould carrier 60 and this results in a corresponding reduction in the mass having to be moved.

The hydraulic medium is conveyed between the individual cylinder chambers via overflow channels. Thus, an overflow channel 36 (FIG. 3) is situated in the piston 65 of the compensating cylinder 62a in order to produce the open connection between the compensating cylinder chamber 34 and the low pressure chamber 15 of the pressure cylinder unit 10. This overflow channel is formed by various bores in the piston 65, such that the hydraulic medium can be transferred in a rapid manner from the compensating cylinder 34 into the low pressure chamber 15 without any problems of flow management. There is another overflow channel 16 in the pressure piston 13 of the pressure cylinder unit 10, which overflow channel 16, however, can be shut-off by means of a valve, in order, where necessary, to separate the low pressure chamber 15 and the high pressure chamber 14. An annular piston 40, which is displaceable in a limited manner on the piston rod 12 or respectively in the pressure piston 13 of the pressure cylinder unit 10, is provided in this case in the form of the hydraulically actuatable valve. If the overflow channel 16 is open, when the mould is closed, hydraulic medium is conveyed initially via the bore 24 into the cylinder chamber 26. On account of the movement this causes, the hydraulic medium is initially displaced out of the hydraulic chamber 27 of the drive cylinder 20 via a hydraulic line in the form of the bore 25. As this movement also moves the cylinder 11 in FIG. 2 to the right, hydraulic medium is displaced out of the compensating cylinder chamber 34 via the overflow channel 36 into the low pressure chamber 15 and from there via the overflow channel 16 into the high pressure chamber 14. As the piston 65 of the compensating cylinder 62a can only be acted upon with hydraulic medium at one end, there is atmospheric pressure in the chamber 37.

The volumes of the compensating cylinder chamber 34 and of the low pressure chamber 15 according to FIG. 2 correspond approximately to the volume of the high pressure chamber 14 in the closed position of the injection mould. However, it is preferably guaranteed that at least one small oil exchange takes place at every cycle in order to ensure that the hydraulic medium is cleaned and cooled.

If the injection mould assembly is closed, the closing pressure has to be built-up in the high pressure chamber 14. To this end, the annular piston 40, provided as the valve, is initially closed via a hydraulic line. The closing pressure is then built-up via a hydraulic line in the form of the bore 17. If the injection process has finished, pressure is initially removed again via the bore 17. The annular piston 40 is then reset via another hydraulic line, which means that the pressure in the high pressure chamber 14 is removed. In principle, the injection mould can then be opened again by means of supplying hydraulic medium via the bore 25 to the hydraulic chamber 27. If this force is not enough to open the mould, with the annular piston 40 closed, an additional high pressure opening can be effected with low pressure chamber 15 and compensating cylinder chamber 34.

In order to avoid any damage which could occur when the closing device is operated if there is no injection mould or if the injection mould is too small, a locking pin 19 is provided at the pressure piston 13; it represents an additional safety system. Should the pressure piston 13 and the piston 65 of the compensating cylinder 62a move too close to one another, the locking pin is actuated. Due to this, the connection between low pressure chamber 15 and high pressure chamber 14 is opened and the pressure is immediately removed.

For further optimization, the supporting element 62 or the compensating cylinder 62a, which is produced in one piece with the supporting element, in accordance with FIGS. 4 to 6, can have connecting elements 62b for the direct connection of at least one distribution block 66, 67. This is more especially possible when the compensating cylinder is produced in the form of a casting, as the corresponding connecting faces can be produced at the same time as the casting is produced. Consequently, a very compact unit is produced with extremely short lines to the switching valves and this contributes to the highest switching precision and consequently also to more precision and speed. Mobile lines can be extensively dispensed with. Leakages are reduced. At the same time, units that can be pre-assembled and tested by the manufacturer are produced.

In accordance with FIGS. 4 and 5, several distribution blocks 66, 67 can be provided, the distribution block 66, for example, being determined for the standard operations, whilst the distribution block 67 being usable for other functions such as ejector or core puller. FIG. 6 does not show the distributor block 67.

It is obvious that this description can be subject to various modifications, amendments and adaptations, which are considered as equivalent to the attached claims.

The invention claimed is:

1. Closing device on a mould closing unit of a plastic injection molding machine for processing plastics materials and other plasticizable substances, the closing device comprising:

at least one hydraulic pressure cylinder unit for building up a closing pressure onto an injection mould accommodated in a mould clamping area between a movable mould carrier and a stationary mould carrier, a pressure piston disposed in the at least one pressure cylinder unit, and comprising a piston rod disposed along a central axis of the at least one pressure cylinder unit, said pressure piston separating a high pressure chamber of the at least one pressure cylinder unit from a low pressure chamber of the at least one pressure cylinder unit wherein the high pressure chamber is arranged between the pressure piston and the movable mould carrier, a hydraulic drive cylinder associated with the at least one pressure cylinder unit for closing the injection mould and disposed concentrically relative to said central axis, wherein a cylinder of the hydraulic drive cylinder is formed by the pressure piston of the at least one pressure cylinder unit, a supporting element for supporting the at least one pressure cylinder unit, wherein at least one cylinder of the mould closing unit is fixedly connected to the supporting element on a side remote from the mould clamping area, wherein the supporting element and the at least one cylinder of the mould closing unit are one piece, and wherein the supporting element is connected to the at least one cylinder of the mould closing unit.

2. Closing device according to claim 1, wherein the supporting element is mounted via a stationary bearing arrangement on a machine base or on a part thereof, and in that the at least one cylinder is also stationary.

3. Closing device according to claim 1, wherein the at least one cylinder being unitary with the supporting element is adapted to be a hydraulic compensating cylinder associated with the at least one pressure cylinder unit for accommodating hydraulic media coming out of the at least one pressure cylinder unit or respectively discharging hydraulic media to be deposited in the at least one pressure cylinder unit, a compensating cylinder chamber of the hydraulic compensating cylinder being in open connection with the low pressure chamber of the at least one pressure cylinder unit, wherein the hydraulic compensating cylinder is disposed concentrically relative to the central axis.

4. Closing device according to claim 1, wherein a piston rod of a compensating cylinder is formed by a cylinder of the at least one pressure cylinder unit.

5. Closing device according to claim 4, wherein the pressure piston and the piston rod of the at least one pressure cylinder unit are stationary and are connected to the at least one cylinder, and wherein the piston rod of the hydraulic compensating cylinder and consequently the cylinder of the at least one pressure cylinder unit is connected to a movable mould carrier for common movement.

6. Closing device according to claim 1, wherein the at least one cylinder being unitary with the supporting element is adapted to be a hydraulic compensating cylinder comprising a piston having an overflow channel for open connection between a compensating cylinder chamber and the low pressure chamber of the at least one pressure cylinder unit.

7. Closing device according to claim 1, wherein the at least one cylinder being unitary with the supporting element is adapted to be a hydraulic compensating cylinder surrounding the at least one pressure cylinder unit.

8. Closing device according to claim 1, wherein in the pressure piston of the at least one pressure cylinder unit there is provided a further overflow channel between the low pressure chamber and the high pressure chamber closable by a valve.

9. Closing device according to claim 8 wherein the valve is formed by an annular piston, which is displaceable in a limited manner on the piston rod or respectively in the pressure piston of the at least one pressure cylinder unit.

10. Closing device according to claim 3, wherein the low pressure chamber and the compensating cylinder chamber are adapted to be put under additional pressure via a hydraulic line.

11. Closing device according to claim 1, wherein the at least one pressure cylinder unit is one single pressure cylinder unit comprising a central axis that is at the same time a central axis or respectively an axis of symmetry of the mould closing unit.

12. Closing device according to claim 1, wherein a locking pin provided on the pressure piston is adapted for opening a connection between the low pressure chamber and the high pressure chamber when actuated by a piston of a compensating cylinder.

13. Closing device according to claim 1, wherein the supporting element or the cylinder that is unitary with the supporting element has connection elements for the connection of at least one hydraulic distribution block.

* * * * *